N. B. GREGG.
RECEPTACLE.
APPLICATION FILED DEC. 27, 1909.
966,740.
Patented Aug. 9, 1910.
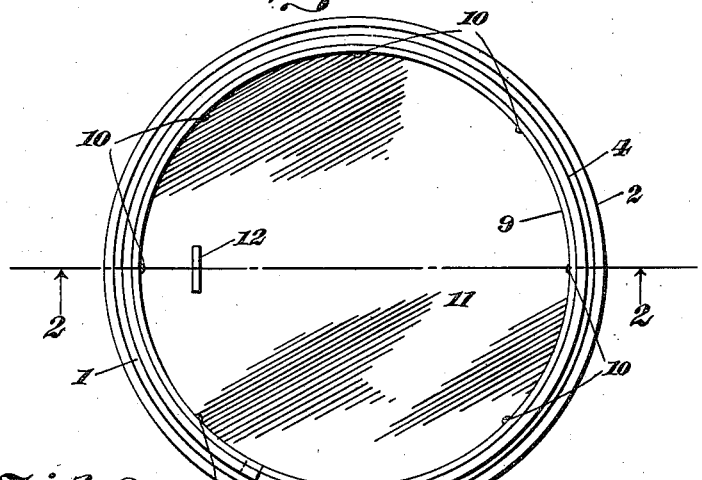
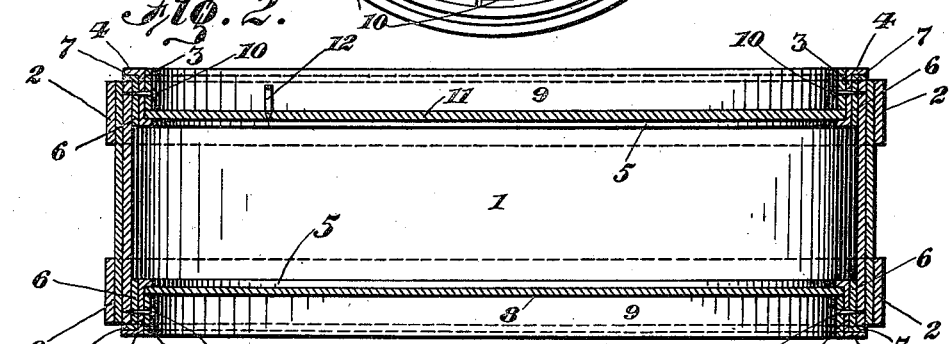
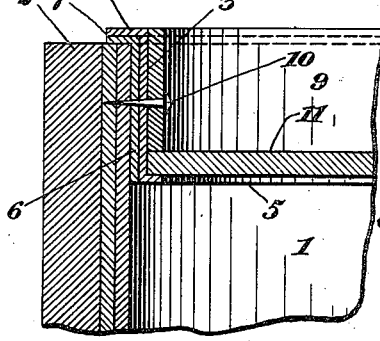
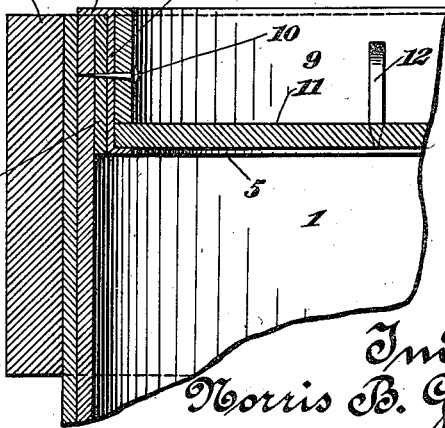
Witnesses:
Chas. A. Becker.
George G. Anderson.
Inventor:
Norris B. Gregg,
By Hugh N. Wagner
His Attorney.

UNITED STATES PATENT OFFICE.

NORRIS B. GREGG, OF ST. LOUIS, MISSOURI, ASSIGNOR TO NATIONAL VENEER PACKAGE COMPANY, OF ST. LOUIS, MISSOURI, A CORPORATION OF MISSOURI.

RECEPTACLE.

966,740.  Specification of Letters Patent.  Patented Aug. 9, 1910.

Application filed December 27, 1909. Serial No. 534,957.

*To all whom it may concern:*

Be it known that I, NORRIS B. GREGG, a citizen of the United States, residing at the city of St. Louis, State of Missouri, have invented certain new and useful Improvements in Receptacles, of which the following is a specification, reference being had therein to the accompanying drawings.

This invention relates to receptacles, especially to that class of receptacles suitable for use in shipping dry material, such as cement, plaster of paris, dry paint, etc., and has for its object to provide a receptacle having certain novel features of construction hereinafter more fully described and pointed out in the claims.

In the drawings forming part of this specification, in which like numbers of reference denote like parts wherever they occur, Figure 1 is a top plan view of a receptacle embodying this invention; Fig. 2 is a sectional view on the line 2—2, Fig. 1; Fig. 3 is a sectional view, on an enlarged scale, showing the means for preventing the leaking of the material from the receptacle; and Fig. 4 is a sectional view, on an enlarged scale, showing an alternate form of the means for preventing the leaking of the material from the receptacle.

The receptacle is preferably cylindrical in form and the wall 1 thereof may be composed of veneer or the fabric of Mellen Patent No. 859,679, dated July 9, 1907, or of any other suitable material. Each edge of the cylinder is reinforced by a hoop 2, secured in any ordinary manner thereto. Each end of said cylinder receives a metal band 3, which is provided with an outwardly-projecting flange 4 and, also, with an inwardly-projecting flange 5. When a band 3 is inserted into an end of cylinder 1, the flange 4 rests on the adjacent end of said cylinder and flange 5 projects inwardly within said cylinder. A gasket or filler 6, which may be composed of felt, paper, or of any other suitable material, is interposed between band 3 and the inner surface of the cylinder for the purpose of preventing the dry material from leaking out of said cylinder. In the preferred form of gasket 6, as shown in Fig. 3, one edge thereof is bent to form a flange 7 in order to provide a means for supporting said gasket from an end of cylinder 1 and, also, to hold same in place until a band 3 is inserted. Said band is of such length that the ends thereof overlap each other when said band is inserted into an end of the cylinder in the manner hereinabove described, and, also, is caused by its own resiliency to press gasket 6 snugly against the wall 1 in an end of the cylinder. In the alternate form of gasket 6', as depicted in Fig. 4, the flange 7 is omitted entirely and said gasket is held in place by a band 3. When it is desired said gasket may be glued, tacked, or secured in any other manner to wall 1.

The bottom 8, which is preferably formed of a thin circular board, is inserted into the band 3 in one end of the cylinder and is of such diameter that it rests on flange 4 thereof and, also, causes said band to press gasket 6 tightly against the wall 1, thereby preventing the material in the cylinder from sifting between band 3 and wall 1. The bottom 8 is secured in place by placing a strip of wood or other material 9 along the edge of said bottom and nailing said strip to wall 1. The nails 10 not only secure strip 9 to wall 1, but, also, fasten band 3 and gasket 6 rigidly to said wall. The top 11 is formed of the same material and shape as bottom 8 and is secured in the same manner in a similar band 3 in the top of the cylinder by a strip 9, there being, also, a gasket 6 interposed between said band and wall 1. A staple 12 or other suitable device is attached to top 11, and affords a means for lifting said top out of band 3 when strip 9 is removed.

When dry material is placed in the receptacle and the top 11 and bottom 8 are secured in place as hereinabove described, the bands 3 and the gaskets 6 prevent the material from leaking from either end of the receptacle, for the reason that each gasket 6 is pressed by a band 3 tightly against wall 1 and prevents the material from sifting between the vertical portion of said band and said wall, and, also, that each flange 5 overlaps the crack between the edge of an endboard resting thereon and prevents the material from entering said crack, and for further reason that the band 3 is by the head (namely, ends 8 and 11) pressed tightly against wall 1 of the open-ended cylinder, leaving no space between band 3 and head 8 or 11. When it is desired to remove the top 11, the strip 9 is removed by drawing the nails 10 which hold same in place and then top 11 is removed by lifting same out of band 3. The material can then be poured out of the package without removing band 3, for the reason that flange 4 is made very narrow, whereby the material flows readily over said flange without lodging behind same. These packages are made in several different sizes so that the empty packages can be telescoped to form a so-called nest containing the several different sizes, for the purpose of shipping. For example, if a nest contains three different sizes, the smallest is placed in the next larger and the next larger containing the smallest is then placed in the largest. The top of each size except the largest is inserted in place without nailing, but after the nest is formed as hereinabove described the top of the largest is inserted in place, thus securing all of the other sizes within the largest size. In like manner a nest containing more than three sizes can be formed by starting with the smallest and placing each consecutively in the next size larger until all are contained in the larger size. Because such nests of empty packages as hereinabove described can be formed, less room than with other packages is taken up in transportation, and for this reason the cost of shipping is greatly reduced.

I claim:

1. A container, comprising, in combination, a hollow cylinder having an open end, an annular gasket fitted in said end and in contact throughout its entire extent with the surface thereof, an annular band disposed in said gasket and encircled thereby, said band being formed at one edge with an outwardly projecting circumferential flange, and at the opposite edge with an inwardly projecting circumferential flange, a cover fitted into said band, and resting upon said inwardly projecting flange, an annular strip also fitted into said band and against the outer face of said cover for holding the latter in position, means for securing said strip, band and gasket to said cylinder, and a hoop encircling the aforementioned open end of said cylinder and secured thereto for reinforcing the same at such point.

2. A container, comprising, in combination, a hollow cylinder having an open end, an annular gasket disposed in said end and formed at one edge with an outwardly projecting circumferential flange adapted to rest on the edge of said cylinder, an annular band fitted within said gasket and encircled thereby, said band being formed at one edge with an outwardly projecting circumferential flange adapted to rest upon the gasket flange, and at the opposite edge with an inwardly projecting flange, a cover fitted into said band, and resting upon said inwardly projecting flange, an annular strip also fitted into said band and against the outer face of said cover for holding the latter in position, means for securing said strip, band and gasket to said cylinder, and a hoop encircling the aforementioned open end of said cylinder and secured thereto for reinforcing the same at such point.

In testimony whereof I have affixed my signature in presence of two witnesses.

NORRIS B. GREGG.

Witnesses:
GLADYS WALTON,
GEORGE G. ANDERSON.